(12) United States Patent  (10) Patent No.: US 6,523,773 B2
Stratico et al.  (45) Date of Patent: Feb. 25, 2003

(54) WIRE SENSORS FOR TANG TERMINATION IN DYNAMO-ELECTRIC MACHINE MANUFACTURING SYSTEMS

(75) Inventors: Gianfranco Stratico, Siena (IT); Maurizio Mugelli, Siena (IT); Giovanni Manuelli, Florence (IT)

(73) Assignee: Axis USA, Inc., Tampa, FL (US)

( * ) Notice: Subject to any disclaimer, the term of this patent is extended or adjusted under 35 U.S.C. 154(b) by 120 days.

(21) Appl. No.: 09/818,293

(22) Filed: Mar. 27, 2001

(65) Prior Publication Data

US 2001/0048046 A1 Dec. 6, 2001

Related U.S. Application Data

(60) Provisional application No. 60/193,011, filed on Mar. 29, 2000.

(51) Int. Cl.[7] ............................................... H02K 15/09
(52) U.S. Cl. .................. 242/433.3; 29/564.6; 29/566.3; 29/596
(58) Field of Search ............................... 242/430, 439, 242/439.1, 433.3; 29/596, 564.6, 566.3

(56) References Cited

U.S. PATENT DOCUMENTS

| | | | | |
|---|---|---|---|---|
| 3,812,577 A | * | 5/1974 | Compton et al. | 242/433.3 |
| 3,857,154 A | * | 12/1974 | Hammond et al. | 29/753 |
| 4,951,379 A | * | 8/1990 | Clemenz | 242/432 |
| 5,127,159 A | * | 7/1992 | Kudo et al. | 29/564.4 |
| 5,127,594 A | | 7/1992 | Lombardi et al. | |
| 5,186,405 A | * | 2/1993 | Beakes et al. | 242/432 |
| 5,187,856 A | * | 2/1993 | Corey et al. | 29/564.6 |
| 5,257,745 A | | 11/1993 | Lombardi et al. | |
| 5,379,511 A | * | 1/1995 | Corey et al. | 29/564.6 |
| 5,392,506 A | * | 2/1995 | Luciani et al. | 29/566.3 |
| 5,495,659 A | * | 3/1996 | Beakes et al. | 29/596 |
| 6,058,595 A | * | 5/2000 | Lewchenko et al. | 29/564.6 |
| 6,067,702 A | * | 5/2000 | Clemenz et al. | 242/432 |
| 6,102,324 A | * | 8/2000 | Farrow et al. | 242/437.2 |
| 6,108,897 A | * | 8/2000 | Beakes et al. | 242/432.4 |
| 6,179,191 B1 | * | 1/2001 | Chopp | 226/112 |

* cited by examiner

Primary Examiner—Emmanuel Marcelo
(74) Attorney, Agent, or Firm—Fish & Neave; Robert R. Jackson; James A. Leiz

(57) ABSTRACT

Sensor arrangements are provided to detect whether initial and final wire leads were properly terminated to tang terminals of dynamo-electric machine components. The sensor arrangements may detect whether excess wire from the termination of the initial wire lead is present on a first side of a wire gripper. The sensor arrangements may detect whether excess wire from the termination of the final wire lead is present on a second side of a wire gripper. The sensor arrangements can include two sensors or a single sensor to detect the presence of the excess wire. Beam sensors, vision sensors, or tactile sensors may be used to detect the presence of the excess wire. A plunger device is provided to facilitate the tearing of thin initial and final wire leads to a tang terminal of a commutator.

44 Claims, 8 Drawing Sheets

WIRE SENSORS FOR TANG TERMINATION IN DYNAMO-ELECTRIC MACHINE MANUFACTURING SYSTEMS

This application claims the benefit of U.S. provisional application No. 60/193,011, filed Mar. 29, 2000, which is hereby incorporated by reference herein in its entirety.

BACKGROUND OF THE INVENTION

The present application concerns detecting unsuccessful terminations and performing successful terminations of wire leads to tang terminals of dynamo-electric machine components.

Typical prior art armature winders are described in commonly-assigned U.S. Pat. No. 5,127,594 to Lombardi et al. and U.S. Pat. No. 5,257,745 to Lombardi et al., which are hereby incorporated by reference herein in their entireties.

Wire grippers have been employed in the prior art winders to grasp and hold the wires, which have been delivered from two flyer arms. Wire grippers typically grasp and hold the wires after the armature has been wound.

Prior to the winding of the armature, wires typically extend from the two flyer arms to respective wire grippers. The wire grippers are holding the wires after the winding and removal of the previous armature. The first step before winding the armature is typically to attach the wires to start points on the commutator (e.g., tang terminals). This process of attaching the wires occurs by rotating the flyer into position and the use of well-known tooling present in the winder. Each of the wires is typically attached to the commutator by wrapping the wire around a tang of the commutator. When the wires are attached to the commutator, the wires extend from the flyer arms to the commutator and then to respective wire grippers. A first tearing step may occur where each of the wire grippers, holding its respective wire, moves in a direction away from the commutator. The wire grippers move away from the commutator in order to pull the wire and tear it against an edge of the commutator during this movement (e.g., the edge of the tang terminal on which the wire has been attached). After the wires have been terminated, the two wires extend from the flyer arm to the commutator and the armature is ready to be wound.

The portions of wire that have been terminated are held with the wire grippers. The wire grippers may deposit these portions in a waste collector as described in commonly-assigned Stratico et al. U.S. patent application Ser. No. 09/371,156, filed Aug. 9, 1999, which is incorporated by reference herein in its entirety.

After the armature has been wound, the wires are typically attached to the commutator as described above. The wires at this point extend from the flyer arms to the commutator. Each wire gripper then grasps a respective wire at a point between the flyer arm and the commutator. Each wire gripper holds the respective wire so that the wire does not run out of the gripping portion. A second tearing step may occur where each of the wire grippers, holding its respective wire, moves in a direction away from the commutator as described above.

After the second tearing step, the wires extend from the flyer arms to the wire grippers. This frees the completely wound armature from the wires so that the armature can be unloaded from the winder. Once the wound armature is unloaded, the winder is then available to accept another armature for winding.

The termination processes that tear the wires attached to the commutator by moving the wire grippers away from the commutator are described in U.S. Pat. No. 3,812,577 to Compton et al., which is hereby incorporated by reference herein in its entirety. During the tearing steps, one of the wires may be torn against its respective wire gripper instead of an edge of the commutator. This results in an excessive length of stray wire that extends from the commutator. Such a length of stray wire from the commutator can interfere with further manufacturing steps of the armature.

These termination processes are also performed on very thin wire leads. Very thin wire leads may have a high probability of tearing at locations other than from the desired tang edge.

It is therefore an object of the present invention to detect improper wire terminations of coil leads to tang terminals of dynamo-electric machine components.

It is also an object of the present invention to stop further processing of a component which has an improper wire termination.

It is also an object of the present invention to facilitate the tearing of very thin wires along the desired edge of a tang terminal.

SUMMARY OF THE INVENTION

These and other objects of the invention are accomplished in accordance with the principles of the present invention by providing sensor arrangements to detect whether the initial and final wire leads were properly terminated to tang terminals of dynamo-electric machine components. When an initial wire lead is terminated to a tang terminal, excess wire which needs to be removed from the tang terminal is stretched between an edge of the tang terminal and a side of a wire gripper. When the initial wire lead is successfully terminated, the excess wire is torn on the edge of the tang terminal. When the initial wire lead is not successfully terminated, the excess wire can be torn on the side of the wire gripper.

Similarly, when a final wire lead is terminated to a tang terminal, excess wire which needs to be removed from the tang terminal is stretched between an opposite edge of the tang terminal and an opposite side of the wire gripper. When the final wire lead is successfully terminated, the excess wire is torn on the edge of the tang terminal. When the final wire lead is not successfully terminated, the excess wire can be torn on the side of the wire gripper.

Sensor arrangements are provided to detect whether the excess wire from the termination of the initial or final wire lead is present on its respective side of the wire gripper. If the excess wire is present, then the wire termination was successful. If the excess wire is absent, then the wire termination was not successful. If the wire termination was not successful, appropriate actions may be taken to stop further processing of the armature.

The sensor arrangements may include optical fiber sensors, vision devices, tactile sensors, or any other suitable sensors for detecting whether the excess wire is present on each side of the wire gripper. In one suitable approach, the sensor arrangement may include two sensors, one sensor for each side of the wire gripper. The sensors may be supported by the wire gripper through a support structure or may be supported independently from the wire grippers.

In another suitable approach, the sensor arrangement may include a single sensor to detect the presence of the excess wire on both sides of the wire gripper. In this approach, the sensor can be positioned near each side of the wire gripper so that it may detect whether the excess wire exists on either side of the wire gripper.

In another embodiment of the present invention, a plunger device is be provided to facilitate the tearing of the initial and final wire leads to tang terminals of a commutator. The plunger device engages the excess wire which needs to be removed at a position between the tang terminal and the wire gripper. The plunger device can move the excess wire to cause it to tear along a desired edge of the tang terminal.

Further features of the invention, its nature and various advantages will be more apparent from the accompanying drawings and the following detailed description of the preferred embodiments.

BRIEF DESCRIPTION OF THE DRAWINGS

FIG. 3a is a cross-sectional view of the illustrative wire gripper of FIG. 3, partly in section, taken generally along the line 3a—3a.

FIG. 3b is another cross-sectional view of the illustrative wire gripper of FIG. 3, partly in section, taken generally along the line 3a—3a.

FIG. 7a is a sectional view of the illustrative apparatus of FIG. 7, partly in section, taken generally along the line 7a—7a.

FIG. 8a is a sectional view of the illustrative apparatus of FIG. 8, partly in section, taken generally along the line 8a—8a.

DETAILED DESCRIPTION OF THE PREFERRED EMBODIMENTS

Figure 1:
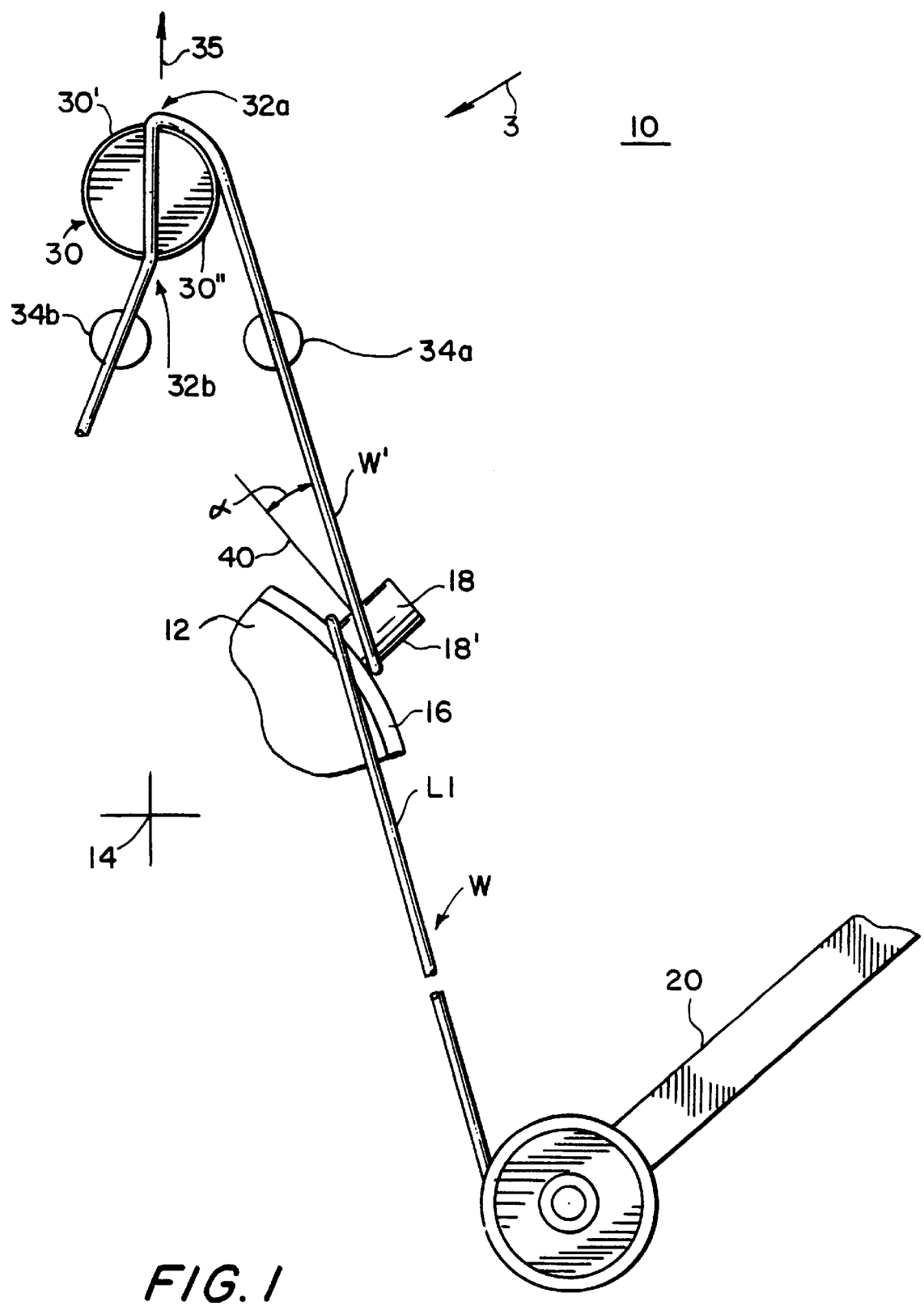
FIG. 1 is a simplified view of illustrative apparatus for terminating an initial wire lead to an armature in accordance with one embodiment of the present invention.

FIG. 1 is a simplified view of apparatus 10 prior to termination of an initial lead of wire W to armature 12. The view in FIG. 1 is taken along longitudinal axis 14 of armature 12 and is directed at the face of commutator 16. Beyond commutator 16 (into the page containing the view of FIG. 1) is the central lamination stack of armature 12 where wire W will be wound. For clarity, armature 12 has been shown in partial representation. The description of the invention will refer to an armature for convenience; however, it is understood that any dynamo-electric core, such as a brushless stator, may be used with the invention as described.

Armature 12 is situated in winding machinery. For clarity, only wire gripper 30, which releasably grasps wire W, and flyer arm 20, which dispenses wire to the armature and winds the wire about the armature, are shown as part of the winding machinery. Again for clarity, wire gripper 30 and flyer arm 20 have been shown in partial representations in FIG. 1. The winding machinery preferably includes a set of two flyer arms like flyer arm 20 and a set of two wire grippers like wire gripper 30. The description of the invention will refer to a single flyer arm and a single wire gripper for convenience; however, it is understood that the present invention may be used with two or more flyer arms and wire grippers.

Once armature 12 has been loaded in the winding machinery, a wire lead needs to be attached to and terminated at commutator 16 prior to winding. As illustrated in FIG. 1, armature 12 has been loaded in the winding machinery and wire W has been attached to tang 18 of commutator 16 with equipment not shown. Wire W extends from flyer arm 20 to commutator 16, where it is partially wrapped around tang 18. From commutator 16 the wire extends through wire gripper 30. Wire lead L1 is the portion of wire W that extends from commutator 16 to flyer winder 20. The process of terminating wire lead L1 involves removing excess wire W' from commutator 16. Excess wire W' can be removed by moving gripper 30 in direction 35. When gripper 30 moves in direction 35, excess wire W' is stretched between wire gripper 30 and edge 18' of tang 18. This action causes excess wire W' to be torn against edge 18'. Upon successful completion of this process, excess wire W' remains held in wire gripper 30 and armature 12 is free to be wound by flyer arm 20. After termination of wire lead L1, wire gripper 30 may deposit excess wire W' in a waste collector as described in U.S. application Ser. No. 09/371, 156.

In order to ensure that wire lead L1 is properly terminated at edge 18', armature 12 may be rotated about axis 14 to achieve an optimal angle α (alpha) prior to wire termination. Angle α (alpha) is the angle formed between excess wire W' and reference direction 40, which is perpendicular to the face of edge 18'.

Figure 2:
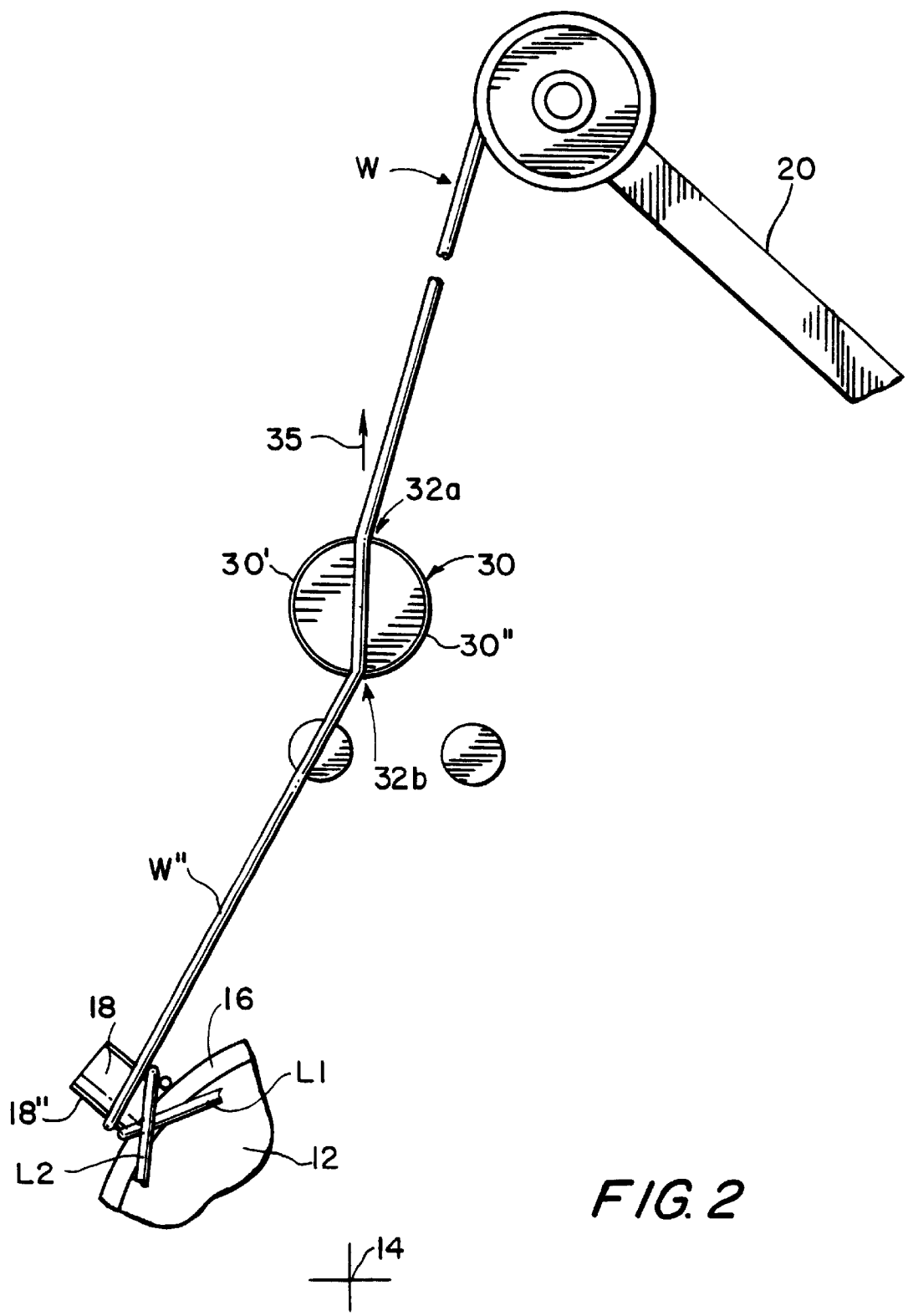
FIG. 2 is a simplified view of illustrative apparatus for terminating a final wire lead to an armature in accordance with one embodiment of the present invention.

After flyer arm 20 winds armature 12, the final wire lead needs to be attached to and terminated at commutator 16. Once the final wire lead is attached to commutator 16, wire gripper 30 grasps the wire between commutator 16 and flyer arm 20. FIG. 2 is a simplified view of apparatus 10 shown in FIG. 1 after armature 12 has been wound and just before final lead L2 is terminated at commutator 16. Final lead L2 is the portion of wire that extends from the final loop of the armature winding to commutator 16. As illustrated, wire W extends from flyer arm 20 through wire gripper to commutator 16, where it is partially wrapped around tang 18. The process of terminating wire lead L2 involves removing excess wire W" from commutator 16. Excess wire W" can be removed by moving gripper 30 in direction 35. This action causes excess wire W" to be torn against edge 18", which is opposite to edge 18' on tang 18. Upon successfully completion of this process, armature 12 is free to be removed from the winding machinery. When the winding machinery receives a new unwound armature, the arrangement of wire W extending from flyer winder 20 through wire gripper 30 is conducive for terminating an initial wire lead to the new armature as described above in connection with FIG. 1.

The wire termination processes described above in connection with FIGS. 1 and 2 preferably result in the excess portions of wire W to be removed by a tearing action against edges 18' and 18" of tang 18. A complication may, however, occur when wire W fails to be torn against tang 18. Wire W may instead, for example, be torn against gripper 30. When this complication occurs, armature 12 may contain stray wire (e.g., improperly torn excess wire W' or W") which extends from tang 18. Such stray wire can interfere with further manufacturing steps of the armature.

Referring to FIGS. 1 and 2 in more detail, wire gripper 30 includes pliers 30' and 30" which can releasably hold wire W. Wire W is held by wire gripper where it passes through sides 32a and 32b of the wire gripper. As shown in FIG. 1, excess wire W' extends from edge 18' to side 32a of wire gripper 30 prior to wire termination. The wire termination complication described above will result in the tearing of excess wire W' at side 32a of wire gripper 30. This complication will result in the removal of excess wire W' from side 32a of wire gripper 30.

As shown in FIG. 2, excess wire W" extends from edge 18" to side 32b of wire gripper 30 prior to wire termination. The wire termination complication for final lead L2 will result in the tearing of excess wire W" at side 32b of wire gripper 30. This complication will result in the removal of excess wire W" from side 32b of wire gripper 30.

Figure 3:
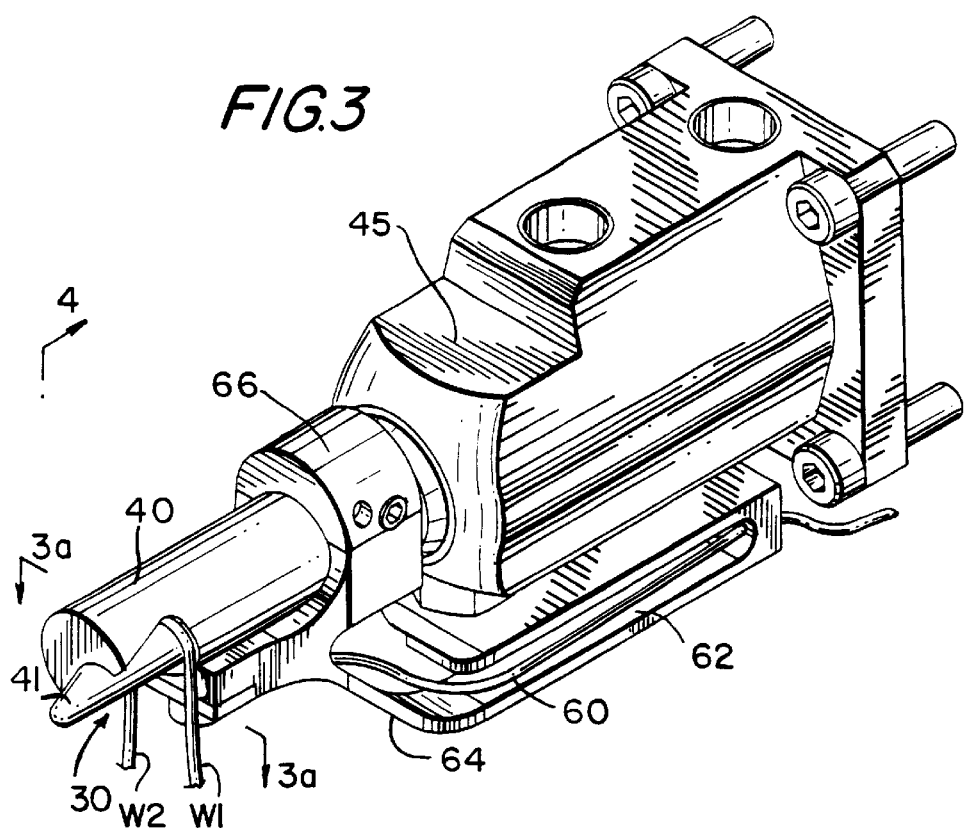
FIG. 3 is a perspective view of an illustrative wire gripper in accordance with one embodiment of the present invention.

FIG. 3 is a perspective view of a wire gripper 30 taken from direction 3 of FIG. 1. As illustrated, wire gripper 30 is holding excess wire W' after a successful wire termination of an initial lead. Wire gripper 30 comprises cylindrical sheath 40 attached to support structure 45. Support structure 45 is configured to move wire gripper 30 during the wire termination process, while armature 12 is being wound, in order to deposit waste wire in a waste collector as described in U.S. application Ser. No. 09/371,156, etc. Wire gripper 30 includes rod 41 which is disposed within cylindrical sheath 40.

Figure 3B:
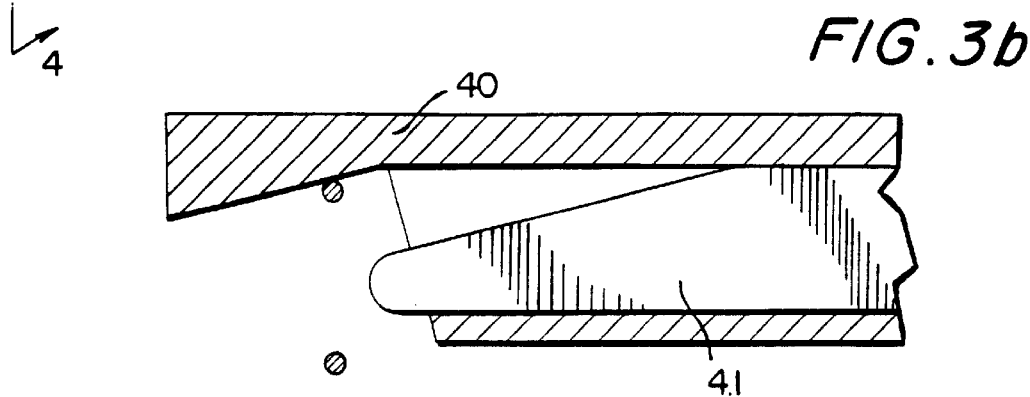
Figure 3A:
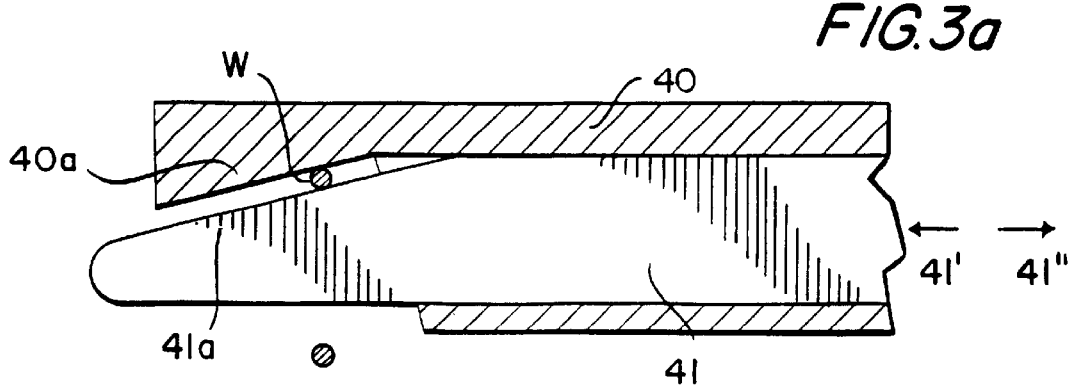

FIG. 3a is an enlarged view of the end portion of gripper 30 taken along the line 3a—3a of FIG. 3. As illustrated in FIG. 3a, the forward end of cylindrical sheath 41 is provided with a slanted abutment portion 40a. The forward end of rod 41 is provided with slanted abutment portion 41a. Abutment portions 40a and 41a confront each other, in a substantially parallel manner, so that wire W can be held between them. Rod 41 is slidable within sheath 40. Rod 41 can be moved in directions 41' and 41" in order to hold and release wire W, respectively. A sufficient pressing action by rod 41 will hold wire W firmly between portions 40a and 41a. As illustrated in FIG. 3a, rod 41 is in a forward position holding wire W.

FIG. 3b is another enlarged view of the end portion of gripper 30 taken along the line 3a—3a of FIG. 3. As illustrated in FIG. 3b, rod 41 is in a rearward position. When rod 41 is in the rearward position, wire gripper 30 is in an open position so that it can receive and release wire W. For example, wire gripper 30 as shown in FIG. 3b can receive wire W when it extends between flyer arm 20 and tang 18 as shown in FIG. 2.

Figure 5:
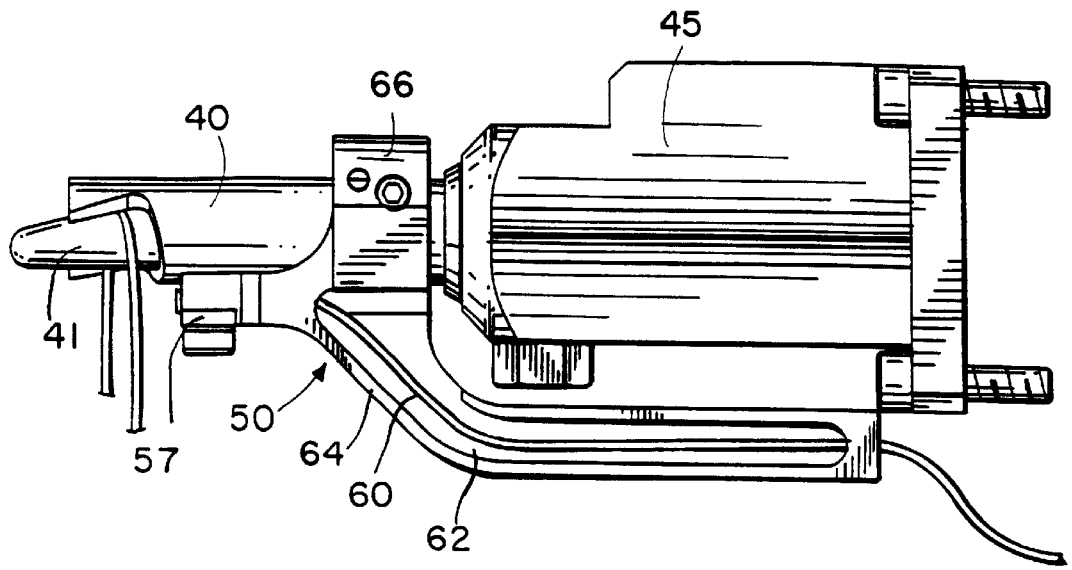
FIG. 5 is an elevational view of the illustrative wire gripper of FIG. 4, taken generally along the line 5—5.
Figure 4:
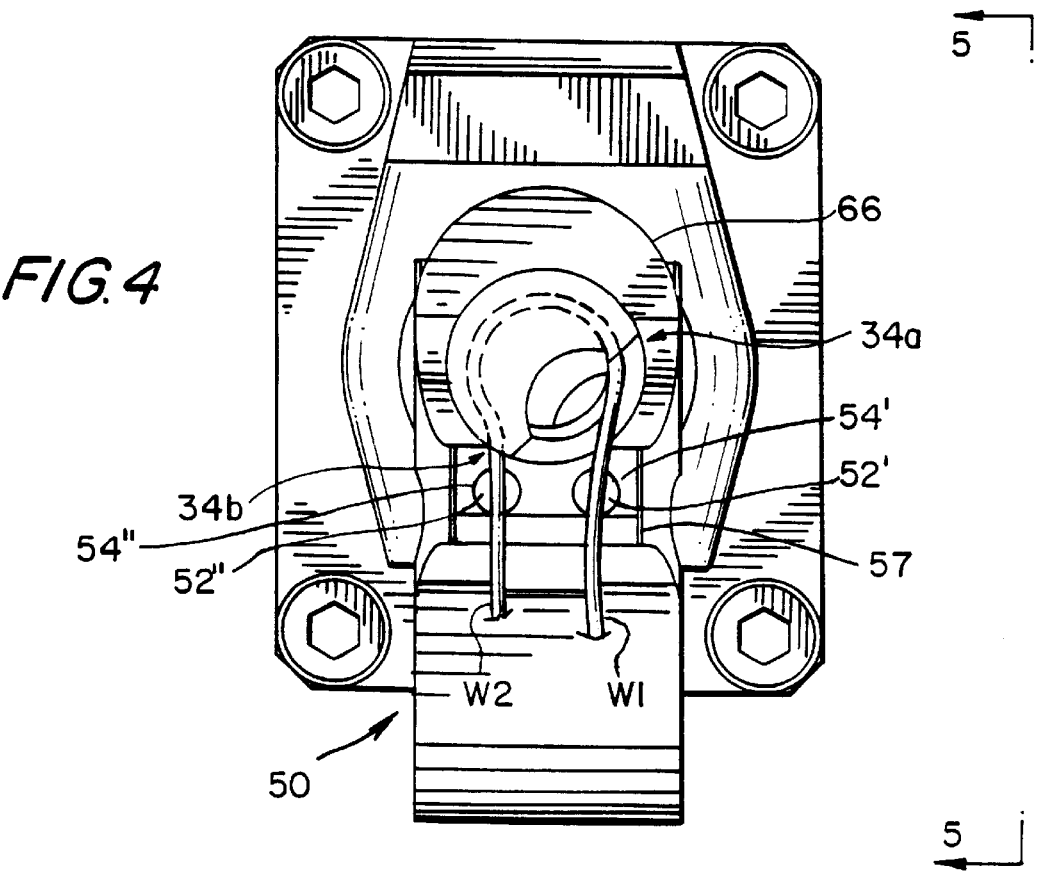
FIG. 4 is an elevational view of the illustrative wire gripper of FIG. 3, taken generally along the line 4—4.

Cylindrical sheath 40 and rod 41 as shown in FIGS. 3–5 can correspond to simplified pliers 30' and 30" as shown in FIGS. 1 and 2.

When the initial lead of wire W is properly terminated to an armature, wire W1 will be present extending from wire gripper 30 as shown in FIG. 3. Similarly, when the final lead of wire W is properly terminated to an armature, wire W2 will be present extending from wire gripper 30. As shown in FIG. 1, properly torn initial and final leads will extend from sides 32a and 32b of wire gripper 30, respectively. By detecting whether the torn leads are extending from sides 32a and 32b of wire gripper 30 (e.g., whether the torn leads are present within regions 34a and 34b) it will be known whether the leads were properly torn.

In accordance with the present invention, a detecting unit is provided to sense whether a torn lead is extending from wire gripper 30 after wire termination. FIG. 4 is an elevational view of wire gripper 30 taken along the line 4—4 of FIG. 3. As illustrated, FIG. 4 shows one suitable embodiment of a detecting unit 50 secured to wire gripper 30. FIGS. 3 and 5 show additional views of detecting unit 50. FIG. 5 is an elevational view of wire gripper 30 and detecting unit 50 taken along the line 5—5 of FIG. 4.

Referring to FIG. 4, when wire W1 is present on side 34a of wire gripper 30, after excess wire W' was stretched and torn between the wire gripper and edge 18', the tearing operation of initial lead L1 was successful. However, if the tearing operation of initial lead L1 was unsuccessful and excess wire W' was torn against side 34a of wire gripper 30, then wire W' will be absent from side 34a. Similarly, when wire W2 is present on side 34b of wire gripper 30, after excess wire W" was stretched and torn between the wire gripper and edge 18", the tearing operation of final lead L2 was successful. However, if the tearing operation of final lead L2 was unsuccessful and excess wire W" was torn against side 34b of wire gripper 30, then wire W" will be absent from side 34b.

As illustrated in FIG. 4, detecting unit 50 includes beam sensors 52' and 52". Beam sensors 52' and 52" respectively detect the presence or absence of wire portions W1 and W2 at sides 34a and 34b, respectively. Beam sensors 52' and 52" are located underneath wire gripper 30 and positioned where the wire portions W1 and W2 are expected to be after the tearing operations. As illustrated in FIG. 4, wire portions W1 and W2 pass in front of beam detectors 52' and 52", respectively.

Beam sensors 52' and 52" are secured within seats 54' and 54", respectively. Beam sensors 52' and 52" can be cylindrically shaped with wire connections extending from their rear ends. Seats 54' and 54" are cylindrically shaped to precisely seat the cylindrically shaped portions of beam sensors 52' and 52". Clamp plate 57 is secured to the bottom forward end of seats 54' and 54" to secure beam sensors 52' and 52" in a stable manner within seats 54' and 54", respectively. The longitudinal axes of beam sensors 52' and 52" are perpendicular to the view shown in FIG. 4. Cables 60, which extend from the rear of beam sensors 52' and 52", pass through the back of seats 54' and 54" and can pass through corridor 62 of arm 64 to reach the controls of the winding machinery. FIG. 5 shows a detailed view of arm 64. Arm 64 is attached to shaft 40 via cylindrical bracket portion 66 of arm 64.

In another suitable approach, beam sensors 52' and 52" can be secured to any other suitable support structure of the winding machinery. Regardless of the structure that beam sensors 52' and 52" are secured to, beam sensors 52' and 52" need to be aimed at locations where wire portions W1 and W2 are expected to be after the tearing operations.

While beam sensors 52' and 52" have been described as being stationary with respect to wire gripper 30, it is understood that beam sensors 52' and 52" can be attached to support structures that can provide relative movement between the beam sensors and wire gripper 30. In one suitable approach, a moveable support structure may bring sensors 52' and 52" into a predetermined position to detect whether wire portions W1 and W2 are present. In another suitable approach, a moveable support structure may be used to move beam sensors 52' and 52" to scan certain predetermined areas to detect whether wire portions W1 and W2 are present. In another suitable approach, the support structure may be stationary and wire gripper 30 may be moved to a predetermined position or may scan certain predetermined areas in order for sensors 52' and 52" to determine whether wire portions W1 and W2 are present. In such arrangements, the predetermined search areas should be situated near sides 34a and 34b of wire gripper 30.

In another suitable approach, a single sensor can be used to detect both wire portions W1 and W2. In this approach, relative movement between wire gripper 30 and the single sensor is used to search or scan predetermined areas to detect whether wire portions W1 and W2 are present. For example, the single sensor may first search or scan an area about side 34a to detect whether wire portion W1 is present. The single sensor may then be positioned to search or scan an area about side 34b to detect whether wire portion W2 is present.

Beam sensors 52' and 52" can be optical fiber sensors that use, for example, red visible light to detect the presence of wire portions W1 and W2, respectively. Light of any other suitable wavelength can also be used. Interruption of the light beam would indicate the presence of wire portion W1 or W2. When the light beam is not being interrupted, it would indicate the absence of wire portion W1 or W2. When beam sensors 52' and 52" are in position for detecting whether wire portions W1 and W2 are present, the controls of the winding machinery may interrogate wire sensors 52' and 52" to determine whether the wire portions ate present. In one suitable approach, the interrogation signals may be sent at one or more predetermined points during the process of winding armature 12. For example, the interrogation signals may be sent when wire gripper 30 reaches the end of its movement in direction 35 during the wire termination process of either the initial or final wire lead. In one suitable approach, the interrogation signals may be triggered by a path sensor (e.g., when wire gripper 30 reaches the end of its movement in direction 35) or by any other suitable manner.

Figure 6A:
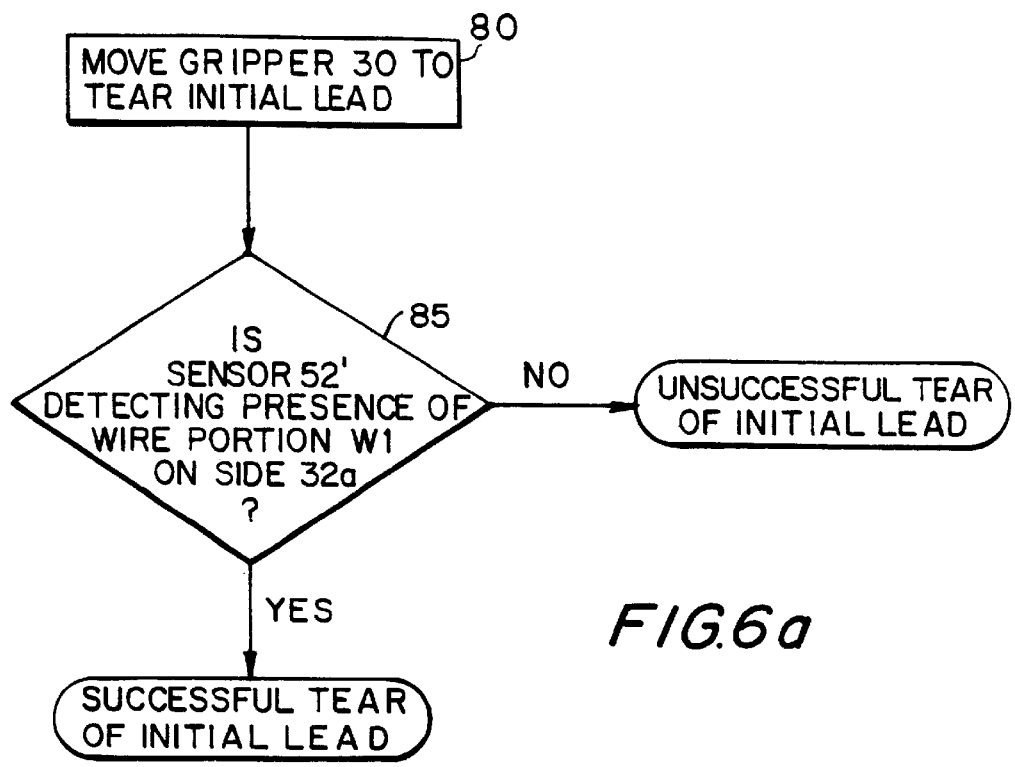
FIG. 6a is a flow chart illustrating steps involved in detecting whether the initial wire lead was successfully torn.

In one suitable arrangement, sensor 52' is interrogated after initial lead L1 is terminated to determine whether excess wire W' was torn properly. FIG. 6a shows a flow chart of illustrative steps that are involved in detecting whether the initial lead was successfully torn. At step 80, a wire gripper (e.g., wire gripper 30) is moved to tear an initial wire lead. At step 85, a sensor (e.g., sensor 52') is interrogated to detect whether a portion of the wire (e.g., wire portion W1) is present extending from the wire gripper. If the sensor detects the portion of the wire, then the initial lead was successfully torn. If the sensor does not detect the portion of wire, then the initial lead was not successfully torn.

Figure 6B:
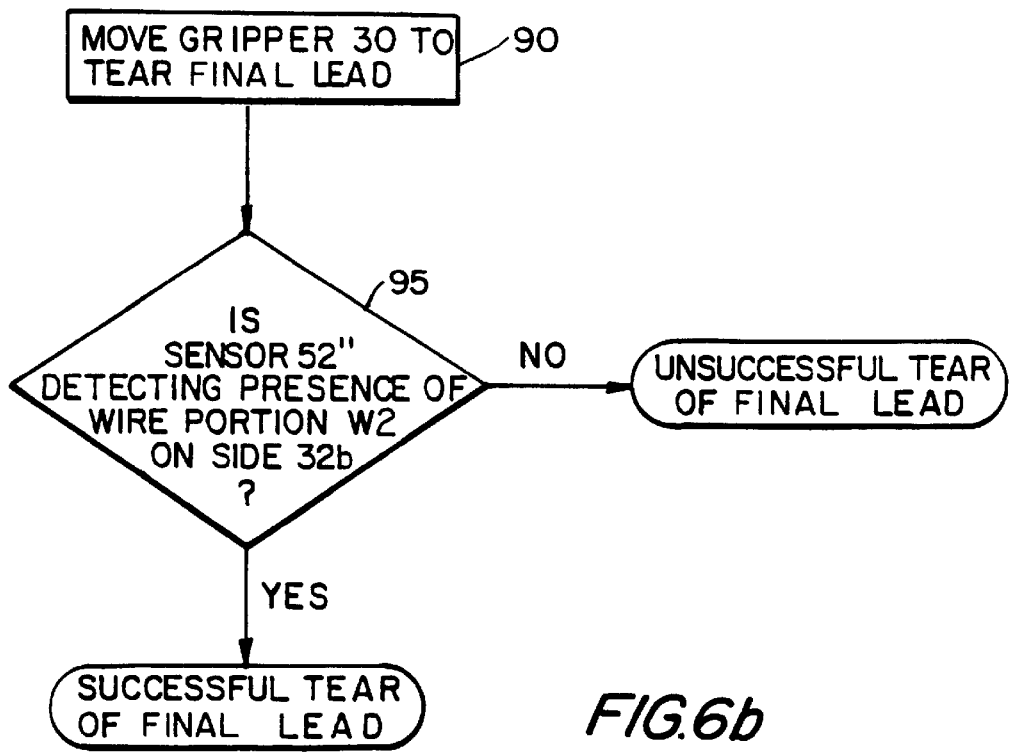
FIG. 6b is a flow chart illustrating steps involved in detecting whether the final wire lead was successfully torn.

In another suitable arrangement, sensor 52" is interrogated after final lead L2 is terminated to determine whether excess wire W" was torn properly. FIG. 6b shows a flow chart of illustrative steps that are involved in detecting whether the final lead was successfully torn. At step 90, a wire gripper (e.g., wire gripper 30) is moved to tear a final wire lead. At step 95, a sensor (e.g., sensor 52") is interrogated to detect whether a portion of the wire (e.g., wire portion W2) is present extending from the wire gripper. If the sensor detects the portion of the wire, then the final lead was successfully torn. If the sensor does not detect the portion of wire, then the final lead was not successfully torn. Any other suitable interrogation arrangement can also be used to determine whether the wire leads were properly torn.

When it is detected that a wire lead was not properly torn, the winding machinery may send a signal to an operator. In another suitable approach, the winding machinery may automatically stop further processing of armature 12 and place the armature in a location designated for rejected armatures. Any other suitable notification or action may be also performed in response to the detection of an improperly torn wire lead.

In another suitable arrangement, beam sensors 52' and 52" can be replaced by one or more vision devices and associated hardware. Such vision devices and software implemented on the hardware would be configured to perform image processing on sides 32a and 32b of wire gripper 30 to determine whether wire portions W1 and W2 are present.

In another suitable arrangement, beam sensors 52' and 52" can be replaced by one or more tactile sensors which can physically sense the presence of wire portions W1 and W2 on sides 32a and 32b of wire gripper 30, respectively. Such tactile sensors may, however, be less sensitive to detecting wires of small diameter.

In another embodiment of the present invention, wire sensors 52' and 52" can be used to determine whether the excess portion of wire W, remaining within wire gripper 30 after termination of wire lead L1, is properly deposited in a waste collector. The actions of depositing the excess wire in a waste collector is described in U.S. application Ser. No. 09/371,156. The process of depositing the excess wire in the waste collector includes positioning wire gripper 30 in a predetermined position and retracting rod 41 to release the excess portion of wire W. The released excess portion of wire W should fall and enter into the waste collector.

If the excess portion of wire W does not successfully release from wire gripper 30, then the excess wire may, for example, be lodged on or between shaft 40 and rod 41. By interrogating sensor 52', sensor 52", or sensors 52' and 52" after the process for depositing the waste wire is performed, it can be determined whether the waste wire was properly released from wire gripper 30. If it is detected that the waste wire did not properly release from wire gripper 30, then a signal may be sent to an operator or any other suitable actions may be taken.

Figure 7:
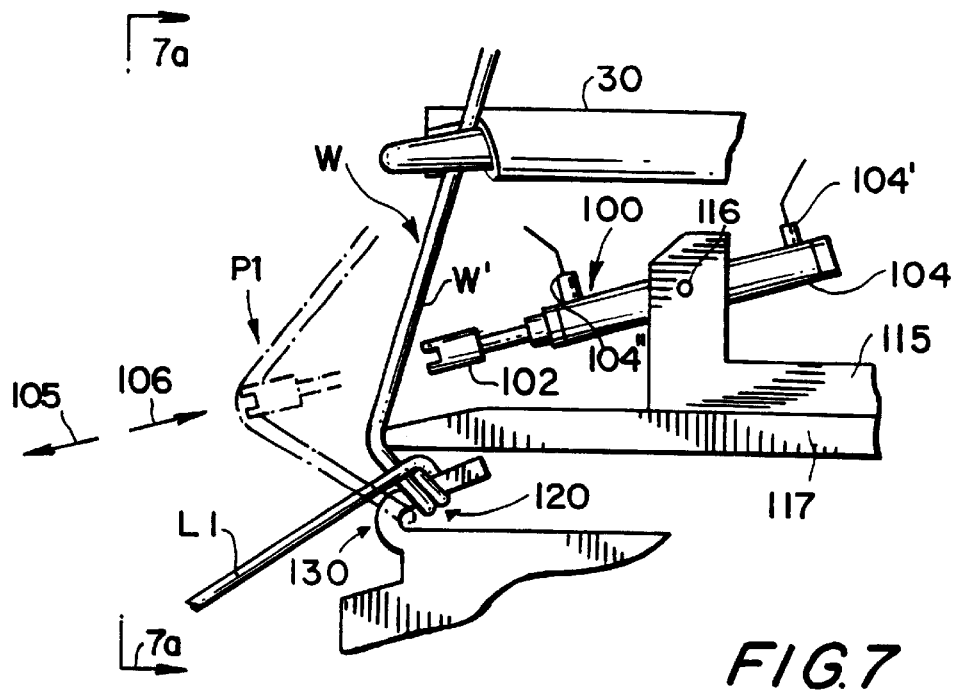
FIG. 7 is an elevational view of illustrative apparatus for terminating an initial lead to a tang terminal in accordance with one embodiment of the present invention.

In another embodiment of the present invention, a plunger device is provided to facilitate the tearing of the initial and final wire leads. The plunger device can be used to facilitate the tearing of very thin wires, which may have a high probability of tearing at locations other than from the desired tang edge. When very thin wire is attached to the tang terminal, the wire can be attached with a double wrap to avoid having the wire become undone from the tang terminal. FIG. 7 is an elevational view of illustrative apparatus for terminating a thin initial wire lead L1 to tang 18. As illustrated, wire lead L1 is attached to tang 18 with a double wrap. Wire W extends from a flyer arm (not shown) to commutator 16, where it is wrapped twice around tang 18. From tang 18, the wire extends through wire gripper 30. In order to facilitate proper tearing of wire lead L1, plunger device 100 is provided. Plunger device 100 includes plunger head 102 and air cylinder 104. The end of plunger head 102 that extends within air cylinder 104 can be enlarged, and provided with seals so that it may act as a piston. Air cylinder 104 has passages 104' and 104" through which air or any other suitable gas can pass. By applying pressurized gas to passage 104', plunger head 102 will move in direction 105. Likewise, by applying pressurized gas to passage 104", plunger head 102 will move in direction 106. Directions 105 and 106 are generally parallel to the longitudinal axis of air cylinder 104. Plunger device 100 is rotatably attached to bracket 115 via shaft 116. Bracket 115 supports plunger device 100 on shield 117. Shield 117 is used to prevent wire W from catching on the tang terminals during winding of armatures.

Figure 7A:
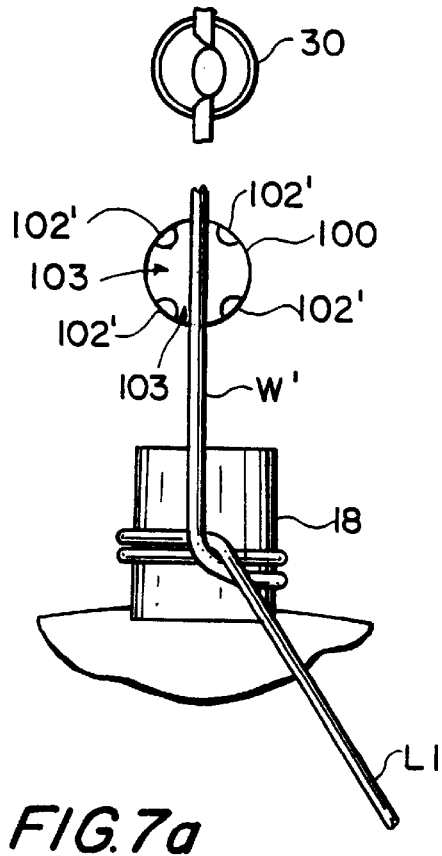

FIG. 7a is a sectional view of the apparatus of FIG. 7 taken along the line 7a—7a. FIG. 7a is an elevational view showing the alignment of plunger device 100 between tang 18 and wire gripper 30. Prior to termination of wire lead L1, the portion of excess wire W' extending between tang 18 and wire gripper 30 is slack. Excess wire W' can be torn by moving plunger head 102 in direction 105 to come into contact with the excess wire. Shield 117, on which plunger device 100 is attached, can be moved to vary the position of plunger device 100. Bracket 115 can be adjusted on shield 117 to provide additional adjustment to plunger device 100. By adjusting the position of plunger device 100 and its angle with respect to bracket 115 via shaft 116, plunger head 102 is capable of intersecting excess wire W' at a desired location and a desired angle. This may be useful, for example, to adjust for various armature sizes, tang terminal sizes, and wire diameters. Plunger head 102 has protuberances 102' which act as guides to keep excess wire W1 within channels 103. As plunger head 102 continues in direction 105, excess wire W' is moved towards position P1 as shown in FIG. 7. This movement of excess wire W' causes tension to increase within excess wire W'. This tension along with the movement of wire portion W' pulls wire portion 120 towards bottom portion 130 of tang 18.

Figure 9:
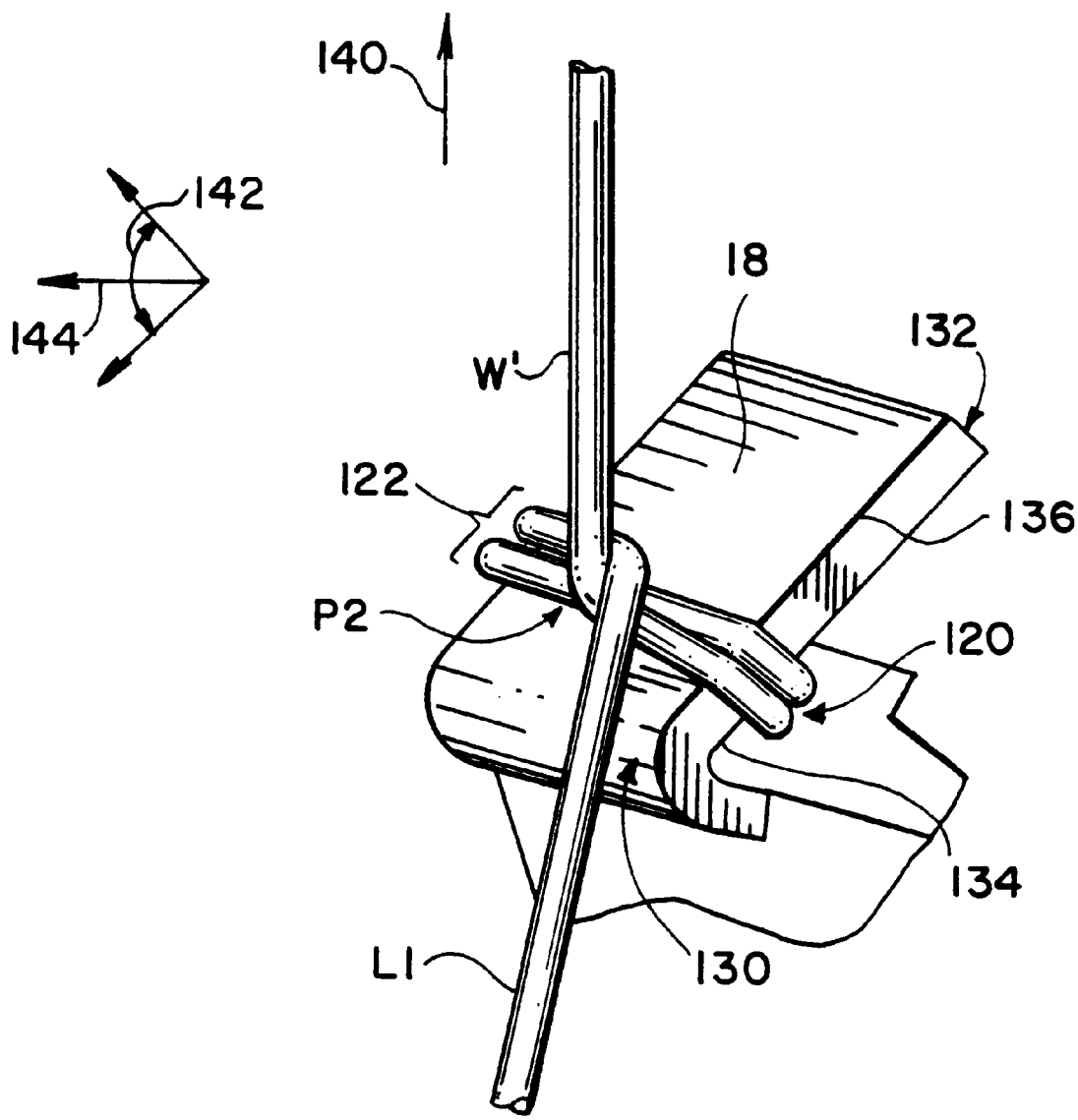
FIG. 9 is a perspective view of an illustrative tang terminal in accordance with one embodiment of the present invention.

FIG. 9 is an enlarged perspective view of tang 18. Tang 18 includes bottom portion 130 and upper portion 132. Edge 134 is the bottom edge that runs between bottom portion 130 and upper portion 132 of tang 18. Edge 136 is the top edge that runs between bottom portion 130 and upper portion 132 of tang 18. When wire portion W' is moved towards position P1, wire portion 120 moves towards bottom portion 130 of tang 18. This is desirable because the portion of edge 134 that is closer to bottom portion 130 of tang 18 tends to be sharper. This increases the likelihood that the wire W will be torn along edge 131. By tearing along edge 131 instead of against edge 136, the end of torn wire W will not be extending up from edge 134 towards edge 136. If the torn portion of wire W extends up from edge 134, the torn portion of wire W can lean outwards from edge 136 during subsequent fusing operations. This can cause the torn portion of wire W to contact wires of adjacent tang terminals, which is not desirable. In addition, by tearing wire portion 120 towards bottom portion 130, wire wraps 122 remain near bottom portion 130 of tang 18. This keeps wire wraps 122 away from upper portion 132 of tang 18, where the wire would be excessively deformed during subsequent fusing operations.

If plunger device 100 is not used to tear wire lead L1 and wire gripper 30 is used to perform this task as described above, then excess wire W' could, for example, be torn across edge 136 or at the point P2, where excess wire W' and wire lead L1 cross. Because wire W can be extremely thin, excess wire W' can also tear at random locations. This would not be desirable as described above. The general tear direction achieved by moving wire gripper 30 is generally along tear direction 140. The tear direction is the direction parallel to the direction of the pull on excess wire W' at the location where excess wire W' tears. By using plunger device 100, the general tear direction achieved may, for example, be within range 142, which facilitates the tearing of excess wire WI along edge 134. An optimum tear direction may be direction 144, which is directed forward of tang 18 (i.e., to the left of bottom portion 130 of tang 18 in FIG. 9). The optimum tear direction may not always be achievable due to possible interferences that may occur with other portions of armature 12 or other equipment.

Figure 8:
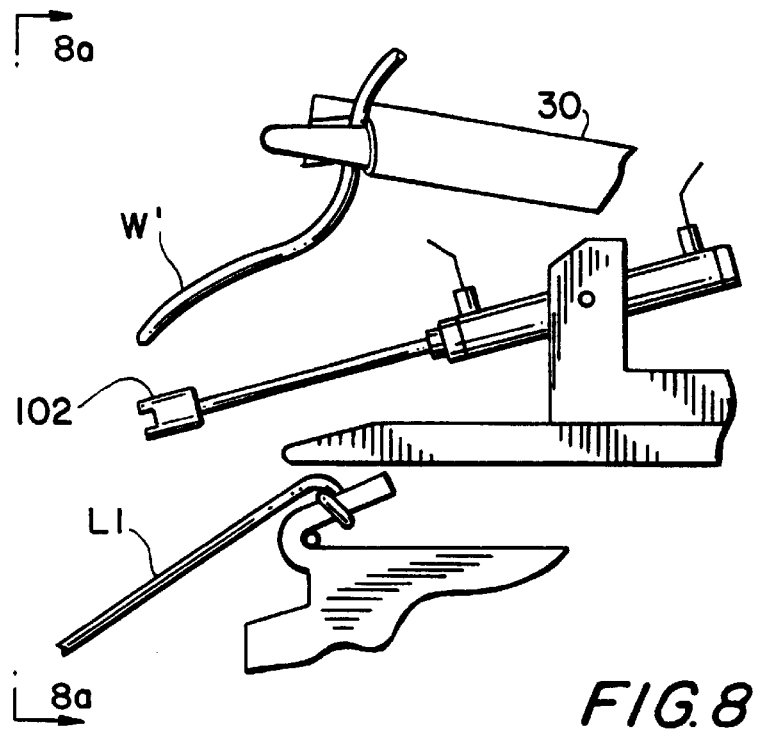
FIG. 8 is another elevational view of illustrative apparatus for terminating an initial lead to a tang terminal in accordance with one embodiment of the present invention.
Figure 8A:
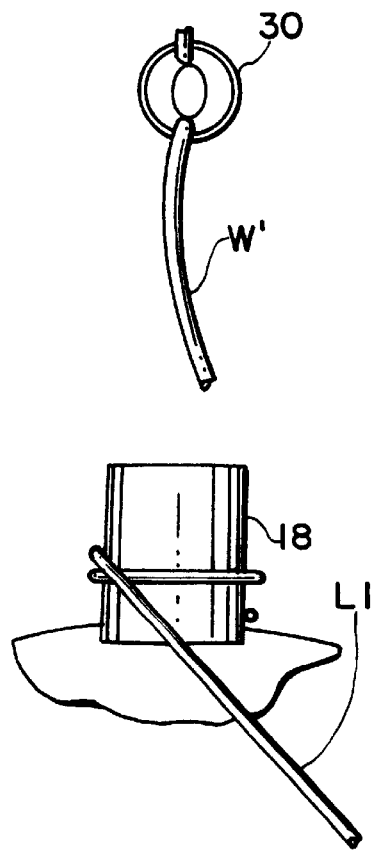

When plunger head 102 reaches position P1, excess wire W' is under tension and is at the point of tearing along edge 134. By varying the original amount of slack in excess wire W' (e.g., by moving wire gripper 30), position P1 can be varied in directions 105 and 106. For example, if more slack is introduced to excess wire W', position P1 would be moved in direction 105. By varying the original slack in wire W', a desired tear direction can be achieved. Another adjustment which may be made to achieve a desired tear direction is to rotate armature 12 about axis 14. When plunger head 102 moves in direction 105 beyond position P1, excess wire W' will be torn. FIG. 8 is a view similar to the view of FIG. 7, which shows the condition of the apparatus after excess wire W' has been torn. FIG. 8a is a sectional view of the apparatus of FIG. 8 taken along the line 8a—8a. As illustrated in FIGS. 8 and 8a, excess wire W' was torn along edge 131.

It is understood that wire gripper 30 as described in connection with FIGS. 7–8 is exemplary, and any other suitable arrangement may be used to grasp excess wire W' (e.g., pivotable grasping fingers, a hook configuration, etc).

Plunger device 100 can also be used to terminate a thin final wire lead to commutator 16 in the same manner as described above.

The foregoing is merely illustrative of the principles of this invention and various modifications can be made by those skilled in the art without departing from the scope and spirit of the invention.

What is claimed is:

1. Apparatus for detecting whether wire leads were properly terminated to tang terminals of dynamo-electric machine components, comprising:
   a wire gripper configured to (a) hold an excess portion of a first wire lead that extends from a first tang terminal of a dynamo-electric machine component to a first side of the wire gripper and (b) move away from the first tang terminal to tear the excess portion of the first wire lead; and
   a detecting unit configured to detect whether the excess portion of the first wire lead is extending from the first side of the wire gripper after the excess portion of the first wire lead was torn.

2. The apparatus defined in claim 1 wherein the detecting unit comprises a single sensor and wherein the detecting unit is configured to move the single sensor to scan a predetermined area about the first side of the wire gripper in order to detect whether the excess portion of the first wire lead is extending from the first side of the wire gripper.

3. The apparatus defined in claim 1 wherein the detecting unit comprises a single sensor selected from the group consisting of a beam sensor, a vision sensor, and a tactile sensor.

4. The apparatus defined in claim 1 wherein the first wire lead is an initial wire lead, wherein the wire gripper is further configured to (a) hold an excess portion of a final wire lead that extends from a second tang terminal of the dynamo-electric machine component to a second side of the wire gripper and (b) move away from the second tang terminal to tear the excess portion of the final wire lead, and wherein the detecting unit is further configured to detect whether the excess portion of the final wire lead is extending from the second side of the wire gripper after the excess portion of the final wire lead was torn.

5. The apparatus defined in claim 4 wherein the detecting unit comprises a first sensor and a second sensor, wherein the first sensor detects whether the excess portion of the initial wire lead is extending from the first side of the wire gripper after the excess portion of the initial wire lead was torn and wherein the second sensor detects whether the excess portion of the final wire lead is extending from the second side of the wire gripper after the excess portion of the final wire lead was torn.

6. The apparatus defined in claim 5 wherein the first and second sensors are stationary with respect to the wire gripper, wherein the first sensor is positioned to detect within a first area where the initial wire lead is expected to be after a successful wire termination of the initial wire lead, and wherein the second sensor is positioned to detect within a second area where the final wire lead is expected to be after a successful wire termination of the final wire lead.

7. The apparatus defined in claim 5 wherein the detecting unit moves the first and second sensors to scan respective predetermined areas about the first and second sides of the wire gripper in order to detect whether the excess portions of the initial and final wire leads are extending from the respective first and second sides of the wire gripper.

8. The apparatus defined in claim 5 wherein the first and second sensors are selected from the group consisting of beam sensors, vision sensors, and tactile sensors.

9. The apparatus defined in claim 4 wherein the detecting unit comprises a single sensor, wherein the single sensor is moved to a first position to detect whether the excess portion of the initial wire lead is extending from the first side of the wire gripper, and wherein the single sensor is moved to a second position to detect whether the excess portion of the final wire lead is extending from the second side of the wire gripper.

10. The apparatus defined in claim 9 wherein the single sensor is selected from the group consisting of a beam sensor, a vision sensor, and a tactile sensor.

11. The apparatus defined in claim 4 wherein the detecting unit comprises a single sensor, wherein the single sensor is moved to scan a first area about the first side of the wire gripper to detect whether the excess portion of the initial wire lead is extending from the first side of the wire gripper, and wherein the single sensor is moved to scan a second area about the second side of the wire gripper to detect whether the excess portion of the final wire lead is extending from the second side of the wire gripper.

12. The apparatus defined in claim 11 wherein the single sensor is selected from the group consisting of a beam sensor, a vision sensor, and a tactile sensor.

13. The apparatus defined in claim 4 wherein the first and second tang terminals are the same tang terminal.

14. A method for detecting whether wire leads were properly terminated to tang terminals of dynamo-electric machine components, comprising:
    tearing an excess portion of a first wire lead by stretching the excess portion of the first wire lead between a first side of a wire gripper and a first tang terminal; and
    detecting whether the excess portion of the first wire lead is extending from the first side of the wire gripper after the excess portion of the first wire lead was torn.

15. The method defined in claim 14 wherein a single sensor is used to detect whether the excess portion of the first wire lead is extending form the first side of the wire gripper, the method further comprising moving the single sensor to scan a predetermined area about the first side of the wire gripper in order to detect whether the excess portion of the first wire lead is extending from the first side of the wire gripper.

16. The method defined in claim 14 wherein a single sensor selected from the group consisting of a beam sensor, a vision sensor, and a tactile sensor is used to detect whether the excess portion of the first wire lead is extending from the first side of the wire gripper.

17. The method defined in claim 14 wherein the first wire lead is an initial wire lead, the method further comprising:
    tearing an excess portion of a final wire lead by stretching the excess portion of the final wire lead between a second side of the wire gripper and a second tang terminal; and
    detecting whether the excess portion of the final wire lead is extending from the second side of the wire gripper after the excess portion of the second wire lead was torn.

18. The method defined in claim 17 wherein a first sensor is used to detect whether the excess portion of the initial wire lead is extending from the first side of the wire gripper and wherein a second sensor is used to detect whether the excess portion of the final wire lead is extending from the second side of the wire gripper.

19. The method defined in claim 18 wherein the first and second sensors are stationary with respect to the wire gripper, wherein the first sensor is positioned to detect within a first area where the initial wire lead is expected to be after a successful wire termination of the initial wire lead, and wherein the second sensor is positioned to detect within a second area where the final wire lead is expected to be after a successful wire termination of the final wire lead.

20. The method defined in claim 18 further comprising:
    moving the first sensor to scan a first predetermined area about the first side of the wire gripper in order to detect whether the excess portion of the initial wire lead is extending from the first side of the wire gripper; and
    moving the second sensor to scan a second predetermined area about the second side of the wire gripper in order to detect whether the excess portion of the final wire lead is extending from the second side of the wire gripper.

21. The method defined in claim 18 wherein the first and second sensors are selected from the group consisting of beam sensors, vision sensors, and tactile sensors.

22. The method defined in claim 17 further comprising:
    moving a single sensor to a first position to detect whether the excess portion of the initial wire lead is extending from the first side of the wire gripper; and
    moving the single sensor to a second position to detect whether the excess portion of the final wire lead is extending from the second side of the wire gripper.

23. The method defined in claim 22 wherein the single sensor is selected from the group consisting of a beam sensor, a vision sensor, and a tactile sensor.

24. The method defined in claim 17 further comprising:
    moving a single sensor to scan a first area about the first side of the wire gripper to detect whether the excess portion of the initial wire lead is extending from the first side of the wire gripper; and
    moving the single sensor to scan a second area about the second side of the wire gripper to detect whether the excess portion of the final wire lead is extending from the second side of the wire gripper.

25. The method defined in claim 24 wherein the single sensor is selected from the group consisting of a beam sensor, a vision sensor, and a tactile sensor.

26. The method defined in claim 17 wherein the first and second tang terminals are the same tang terminal.

27. Apparatus for terminating thin wire leads to tang terminals of dynamo-electric machine components, comprising:

a wire gripper configured to hold an excess portion of a thin wire lead that extends from a tang terminal, wherein the thin wire lead is attached to the tang terminal; and a plunger device configured to (a) contact the excess portion of the thin wire lead at a location between the wire gripper and the tang terminal and (b) move the excess portion of the thin wire lead to tear the excess portion of the thin wire lead at the tang terminal.

28. The apparatus defined in claim 27 wherein the excess portion undergoes tension when the plunger device moves the excess portion.

29. The apparatus defined in claim 27 wherein the plunger device comprises a plunger head configured to capture the excess portion of the thin wire lead.

30. The apparatus defined in claim 29 wherein the plunger device further comprises an air cylinder, wherein a portion of the plunger head (a) is positioned within the air cylinder and (b) is configured to operate as a piston, and wherein by applying pressurized gas within the air cylinder, the plunger head can be extended and retracted within the air cylinder in directions substantially parallel to the longitudinal axis of the air cylinder.

31. The apparatus defined in claim 27 wherein the plunger device is adjustable to contact the excess portion of the thin wire lead at a desired location.

32. The apparatus defined in claim 27 wherein the plunger device is configured to move the excess portion of the thin wire lead in a desired direction.

33. The apparatus defined in claim 27 wherein when the excess portion of the thin wire lead is moved by the plunger device, the portion of the excess portion of the thin wire lead that interacts with the tang terminal is torn by moving along an edge of the tang terminal.

34. The apparatus defined in claim 33 wherein the portion of the excess portion that interacts with the tang terminal is torn by moving along an edge of the tang terminal towards the bottom portion of the tang terminal.

35. The apparatus defined in claim 33 wherein the portion of the excess portion that interacts with the tang terminal is torn at a bottom edge of the tang terminal.

36. A method for terminating thin wire leads to tang terminals of dynamo-electric machine components, comprising:

gripping an excess portion of a thin wire lead that extends from a tang terminal, wherein the thin wire lead is attached to the tang terminal; and moving the excess portion of the thin wire lead at a location between the wire gripper and the tang terminal to tear the excess portion of the thin wire lead at the tang terminal.

37. The method defined in claim 36 wherein the excess portion undergoes tension when the excess portion is moved.

38. The method defined in claim 36 wherein the excess portion of the thin wire lead is moved with a plunger device.

39. The method defined in claim 36 further comprising applying pressurized air to an air cylinder to move a plunger head, wherein the plunger head contacts and moves the excess portion of the thin wire lead at the location between the wire gripper and the tang terminal to tear the excess portion of the thin wire lead at the tang terminal.

40. The method defined in claim 36 further comprising adjusting the plunger device to contact the excess portion of the thin wire lead at a desired location.

41. The method defined in claim 36 further comprising moving the excess portion of the thin wire lead in a desired direction.

42. The method defined in claim 36 wherein moving the excess portion of the thin wire lead at the location between the wire gripper and the tang terminal causes a portion of the excess portion of the thin wire lead that interacts with the tang terminal to tear by moving along an edge of the tang terminal.

43. The method defined in claim 42 wherein the portion of the excess portion moves along the edge of the tang terminal towards the bottom portion of the tang terminal.

44. The method defined in claim 42 wherein the portion of the excess portion that interacts with the tang terminal is torn at a bottom edge of the tang terminal.

* * * * *